April 28, 1931. C. BIRDSEYE 1,802,369
REFRIGERATING APPARATUS
Filed July 2, 1929 4 Sheets-Sheet 1

INVENTOR
Clarence Birdseye
by H.W.Kenway

April 28, 1931.                C. BIRDSEYE                 1,802,369
                        REFRIGERATING APPARATUS
                  Filed July 2, 1929      4 Sheets-Sheet 2

INVENTOR
Clarence Birdseye
by H.W. Kenway
City

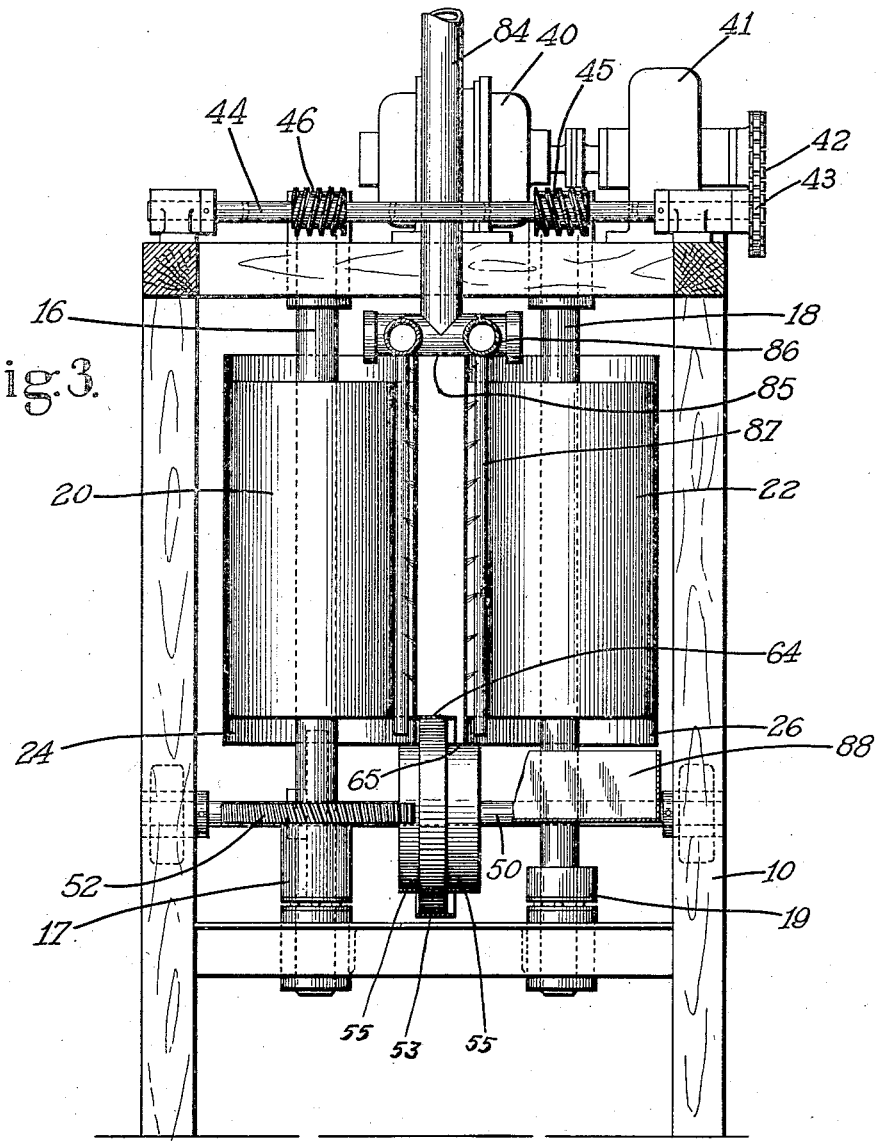

April 28, 1931. C. BIRDSEYE 1,802,369
REFRIGERATING APPARATUS
Filed July 2, 1929   4 Sheets-Sheet 4
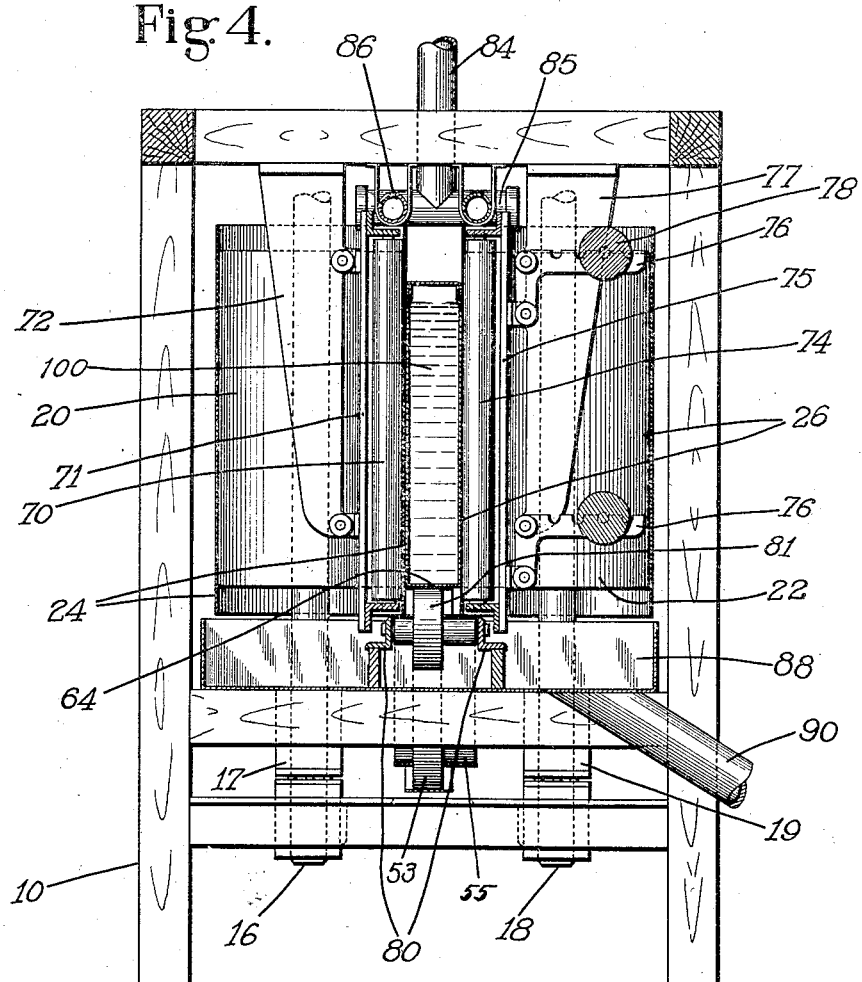
INVENTOR
Clarence Birdseye
by H.W. Kenway Atty Patented Apr. 28, 1931

1,802,369

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

REFRIGERATING APPARATUS

Application filed July 2, 1929. Serial No. 375,418.

This invention relates to refrigerating apparatus of the type used for freezing, quick-freezing or chilling articles of all sorts, but particularly food products.

In one aspect, my invention consists in refrigerating apparatus including a heat-conductive member having a flat face disposed in vertical position against which the product to be frozen may be held. While it is believed that this construction is broadly new for any purpose, it has a special advantage in the freezing of liquid or semi-liquid products in containers. Refrigerating apparatus as heretofore constructed has employed heat-conductive members with horizontally disposed effective faces between or upon which flat containers have been placed. It will be apparent, however, that in a partially filled liquid container disposed in a horizontal position the air space will coincide substantially with the full horizontal dimensions of the container and form an effective insulating blanket between the material to be frozen and a superposed horizontal heat-conductive member. In freezing liquid products, however, I contemplate employing a comparatively narrow or thin container which may be disposed on edge in vertical position so that any air enclosed therein will collect in the upper portion of the container above the product to be frozen and where it is not interposed between the product and the heat-conductive surface. It will be apparent that under these conditions maximum refrigerating economy is insured and the time required for freezing correspondingly reduced.

Preferably and as herein shown, I employ a pair of oppositely disposed heat-conductive members so that the product may be frozen equally and simultaneously from both sides thereof. A convenient type of heat-conductive member consists in a thin metallic belt or band and where this is employed it may be utilized for the additional function of a conveyor, enabling the apparatus to be used in continuous process fashion and for the purpose of conveying the product to be frozen through a refrigerating chamber.

An important feature of my invention consists in the provision of means for yieldingly engaging the product to be frozen by and between two vertically disposed heat-conductive members, whereby intimate and effective contact is secured and the apparatus adapted for handling products of varying shape and dimensions. As herein shown, the desired results are accomplished by arranging one of the heat-conductive bands for bodily movement toward and from the other and providing means tending at all times to urge the bands together to a point determined by their engagement with an interposed product.

In some cases, it has been found advisable to employ a supplementary horizontal conveyor belt to carry the weight of the product which is interposed between the vertical belts. In another aspect, accordingly, my invention consists in an endless conveyor having vertical heat-conductive walls and a horizontal portion serving as a carrier for the product to be refrigerated between the walls.

My invention also includes novel and effective means for supplying a liquid cooling medium to vertically disposed heat-conductive surfaces; also novel means for guiding and maintaining the heat-conductive bands in the desired predetermined path of travel.

These and other features of the invention will be best understood and appreciated from the following description of a preferred embodiment thereof, selected for purposes of illustration and shown in the accompanying drawings, in which Fig. 1 is a view of the apparatus in side elevation, certain parts being shown in section;

Fig. 3 is a sectional view, on an enlarged scale, on the plane 3—3 of Fig. 2; and Fig. 4 is a similar view on the plane 4—4 of Fig. 2.

Figure 1:
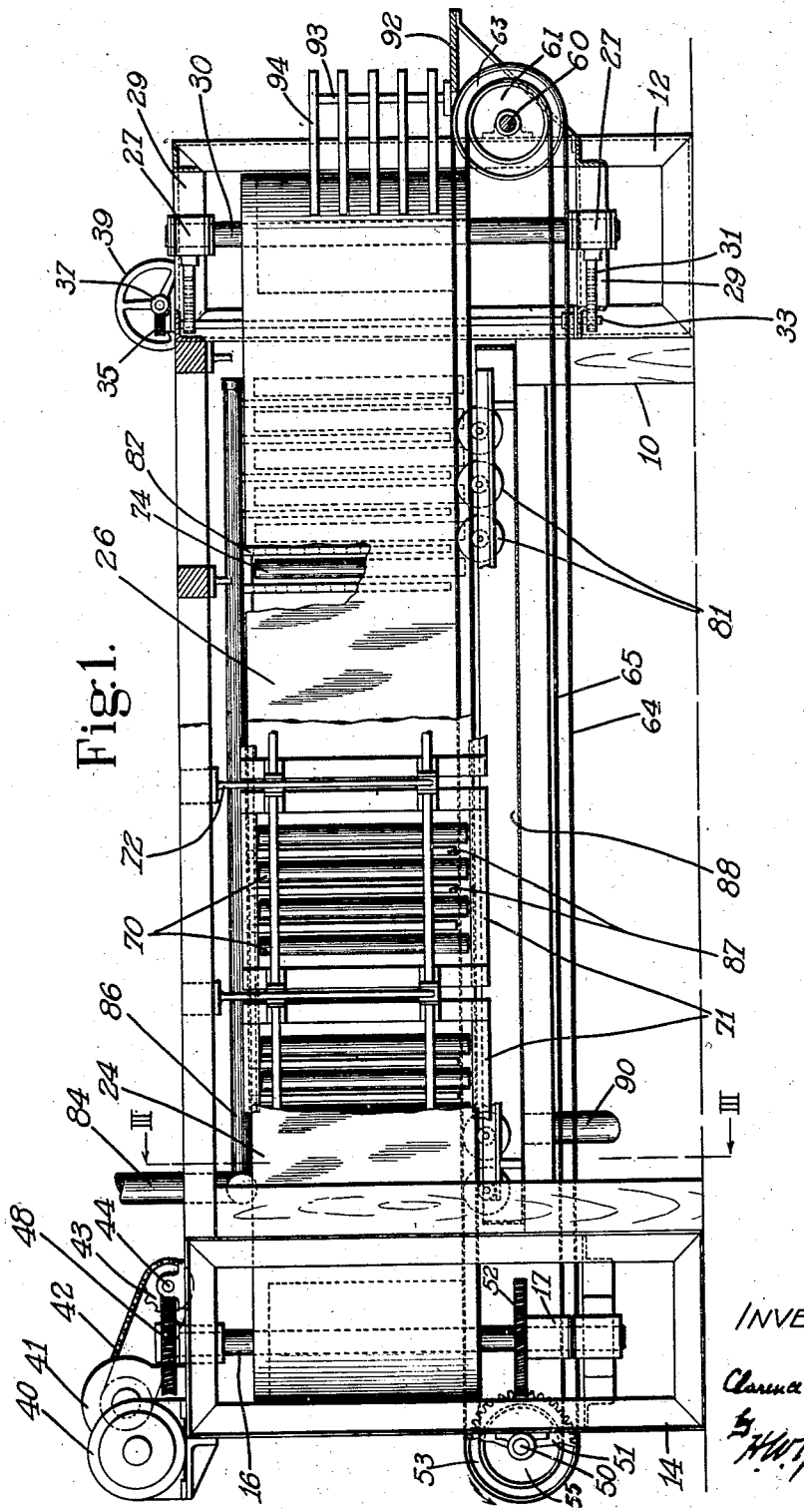

The frame of the apparatus is constructed in three sections, an intermediate section 10 which may be of any desired length, an end section 12 carrying the vertical drums at the receiving end of the apparatus, and a section 14 carrying the vertical drums and driving mechanism at the delivery end of the apparatus. Preferably, the intermediate section will be entirely closed to form a refrigerating chamber and the conveyor bands leave this chamber through restricted openings so that heat loss is reduced to a minimum.

In the end section 14 of the frame are journaled two vertical shafts 16 and 18 carrying drums 20 and 22 respectively. The shafts are driven slowly in opposite directions by a motor 40 secured to the frame and acting through a reducing gear mechanism 41 to drive a sprocket chain 42 running over a driven sprocket 43 on the end of a transverse worm shaft 44, journaled in bearings secured to the top of the frame 14. The worm shaft 44 is provided with worms 45 and 46 of opposite pitch which mesh with worm wheels 47 and 48 keyed to the shafts 18 and 16 respectively. The arrangement of the gearing is such as to rotate the drum 22 in a clockwise direction and the drum 20 in an anti-clockwise direction, with the result that their adjacent surfaces move in the same direction and at the same speed. The bearings for the shafts 16 and 18 are stationary and so spaced that the drums are separated by a distance slightly greater than the width of the product to be treated.

The end section 12 at the receiving end of the apparatus is provided with bearings for vertical shafts 28 and 30. The bearings for the shaft 28 are secured in place so that the drum 32 upon this shaft is located at the proper distance from the drum 20 for the endless metal band 24 which is carried by this pair of drums. The bearings 27 for the shaft 30, which carries a drum 34, are guided for adjusting movement longitudinally of the apparatus by guide members 29 and provision is made for simultaneously moving these bearings to adjust the tension of the band 26 which is carried by the drums 34 and 22. To this end, each bearing is provided with an extension 31 having rack teeth therein which mesh with pinions carried by a vertical shaft 33, having at its upper end a worm wheel 35 meshing with a worm 37 on the inner end of a shaft which projects inwardly from a hand wheel 39. By turning the hand wheel 39, accordingly, the bearings 27 are shifted simultaneously longitudinally of the apparatus. It will be understood that the drums 32 and 34 act as idle rolls and are driven by the endless bands which pass over them.

In addition to the vertical shafts mounted in the end frame 14, a horizontal shaft 50 is also supported in bearings upon the outer members of the frame. Keyed to the shaft 50 is a large spiral gear 51 meshing with a corresponding spiral gear 52 fast to the lower end of the shaft 16. Between its ends the shaft 50 carries a group of three pulleys, comprising a pulley 53 of relatively large diameter keyed to the shaft and interposed between two smaller loose pulleys 55. A similar shaft 60 is journaled in the end frame 12 at the delivery end of the apparatus, carrying a similar group of pulleys 63 and 61, all of which are idle in this case. Running over center pulleys 53 and 63 is an endless conveyor belt 64 of thin metal of suitable width to be received between the two vertical bands 24 and 26 and movable at the same linear speed as the vertical bands. Running over the smaller loose pulleys 55 and 61 is a pair of endless belts 65, each of which is arranged to underlie and support the lower edge of one of the vertical bands 24 or 26, preventing it from slipping downwardly as it travels in its inner and operative reach, and being moved by the frictional engagement of its associated band.

From the foregoing description it will be seen that the vertical bands 24 and 26 cooperate with the horizontal supporting belt 64 to form a conveyor with uniformly moving walls and bottom which has the capacity for a product presented edgewise or in vertical position. The horizontal pulleys are located outside or beyond the vertical drums so that the horizontal supporting belt 64 extends beyond the vertical bands at both ends, thus facilitating presentation of the product to the apparatus and its removal therefrom. It is, moreover, guided in a path above the level of the lower edges of the vertical bands for a purpose which will presently appear.

The inner reach of the vertical band 24 is supported and guided in a predetermined fixed path by a series of vertical guide rolls 70 arranged in groups of six rolls each and journaled in frames 71 which are supported in place by bracket members 72 secured at intervals to the frame 10. The guide rolls 70 are spaced slightly from each other and act to unyieldingly back up the flexible band 24 throughout its travel in the frame 10.

The inner reach of the vertical band 26 is similarly supported by a series of rolls 74 mounted in similar frames and arranged to press yieldingly inwardly against the band, causing it to engage the product to be refrigerated with a yielding pressure of predetermined magnitude. To this end, the rolls 74 are journaled in frames 75 which are carried by pairs of parallel bell crank levers 76 pivotally mounted upon vertical brackets 77 secured to the frame 10 in spaced relation. Each of the levers 76 has an outwardly-extending arm provided in its upper edge with notches to receive adjustably a weight 78. The pressure of the rolls 74 upon the band 26 may be increased by moving the weight 78 outwardly upon the horizontal arms of the levers 76 and it may be correspondingly reduced by moving the weights inwardly toward the fulcrum of the levers. It will be noted that the drums 53 and 63 for the supporting belts are not centrally placed between the bands but that both of these are located nearer to the band 24 than to the band 26, for the purpose of permitting the self-adjusting pressure movement of the band 26.

Located in line with the pulleys 53 and 63 and extending longitudinally of the intermediate frame 10 is a pair of rails 80 between which is journaled a series of supporting rolls 81 corresponding in size to the pulleys 53 and 63 and acting to support the horizontal supporting belts 64 and 65. These rolls are idle rolls which act to maintain the supporting belts in the desired predetermined path of travel throughout the length of the frame 10 and regardless of the weight of the product being handled by the apparatus.

Means for flowing liquid cooling medium upon the operative section of the vertical belts 24 and 26 will now be described. As a refrigerating medium I prefer to employ calcium chloride brine refrigerated approximately to −40°–45° F., although any other suitable medium would serve as well. Brine is supplied by a pipe 84 communicating with a transverse header 85 from which extend two longitudinal distributing pipes 86, one located above and parallel to the inner reaches respectively of the belts 24 and 26. Extending vertically downwardly from each distributing pipe 86 is a series of vertical spray pipes 87, one spray pipe being located between each pair of rolls 70 or 74. The spray pipes 87 are perforated so that the brine flows out in the form of a spray and is directed into immediate contact with the outer face of the inner reach of the bands 24 and 26. The result is that each of these bands, which is a heat-conductive member of high efficiency, is maintained continuously at substantially the temperature of the brine and the heat of the product contained between the bands is conducted away and absorbed by the brine. The brine passes freely downwardly over the surface of the bands and is collected in a trough 88 located in the frame 10 and extending throughout the refrigerating chamber. The vertical bands shield the product from contact of the brine at both sides and, as the belt 64 maintains the product above the level of the lower edges of the bands, no brine can reach it from beneath. The brine collected in the trough 88 is discharged through a pipe 90, by which it is carried back to the refrigerating machine and cooled again for re-circulation.

At the receiving end the frame 12 carries a table 92 upon which the product to be frozen may be placed in presenting it to the machine. The table is provided with a pair of vertical standards 93, each of which carriers a series of guide members 94 flaring at their outer ends and extending inwardly toward the bite of the bands as they pass about the drums 32 and 34. One of the standards 93 is adjustable so that products of different thicknesses may be accommodated between the guides. These guides centralize the product and facilitate its entrance to the apparatus.

Figure 2:
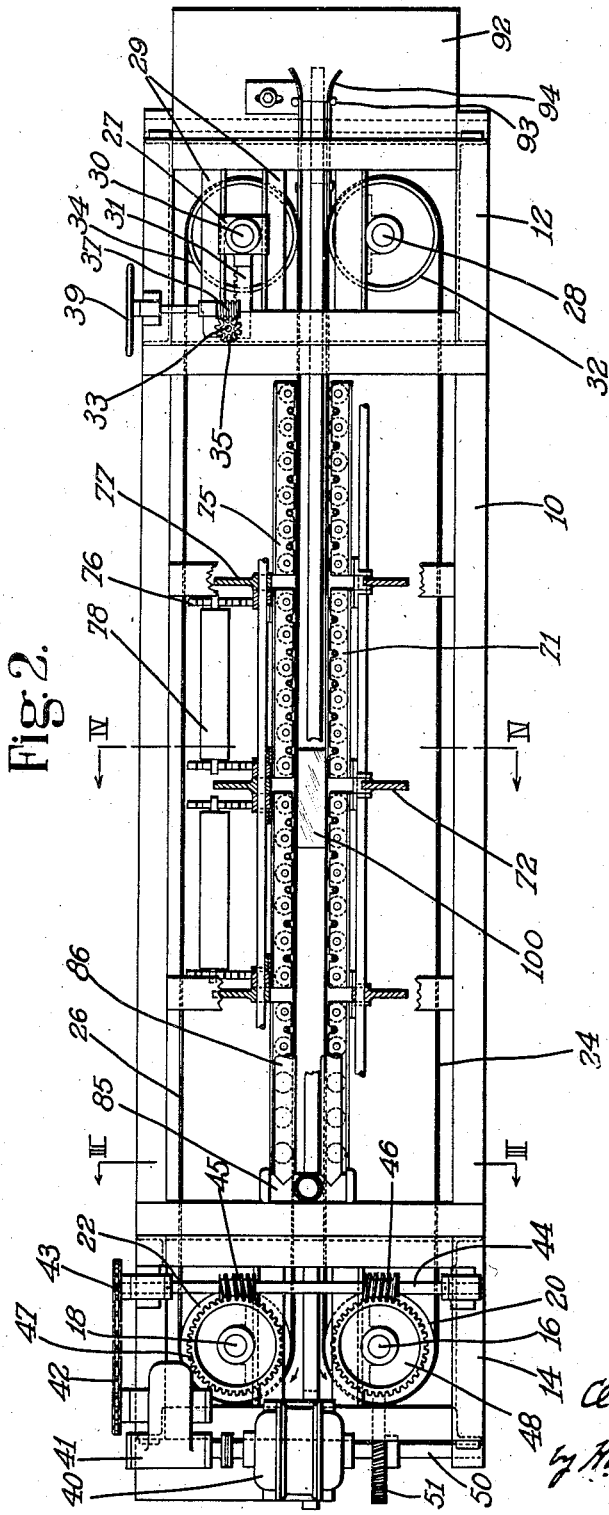
Fig. 2 is a plan view, with parts shown in section.

While the apparatus herein shown may be employed with advantage for freezing any product presented with its major dimension vertical, a particularly useful field of application is in freezing liquids such as fruit juice, dairy products, liquid egg, and the like. For purposes of illustration, therefore, I have shown a flat rectangular container 100 in Figs. 2 and 4 as in process of having its liquid contents quick-frozen in the apparatus. The container is firmly engaged between the inner reaches of the heat-conductive bands 24 and 26 with intimate contact over the entire area of its opposite sides. The heat of its liquid contents, therefore, is absorbed rapidly and simultaneously from both sides by the action of the brine in flowing over the outer faces of the vertical bands. The container 100 is, moreover, completely shielded from any direct contact with the brine, so that upon being discharged between the drums 20 and 22 it is ready for immediate shipment or storage. The container 100 is filled so as to leave a small air space within the cover to allow for the expansion of the liquid in freezing. As the side walls of the container are supported by the heat-conductive bands, this expansion takes place entirely in an upward direction and is effective merely to reduce the size of the air space.

The apparatus herein disclosed may be operated in continuous process fashion by maintaining the bands in motion at a slow rate of speed, introducing the units of unfrozen product continuously at the receiving end and discharging the frozen product continuously at the delivery end. If preferred, however, the apparatus may be operated intermittently, in which case the bands will be advanced to fill with containers or other product the space between the inner reaches of the heat-conductive bands 24 and 26 and then brought to rest until the entire charge has been frozen, whereupon the bands are again set in motion to carry the frozen product out of the apparatus. Under commercial conditions it has been found that a liquid container 2″ in width may be quick-frozen in the apparatus illustrated in the course of about 20 minutes with an adequate supply of brine at the temperature indicated.

Having thus described my invention, what I claim as new and desire to secure by Letters Patent is:

1. A refrigerating apparatus comprising a heat-conductive member having a face disposed in vertical position, means for supplying a refrigerating medium to said member to chill said face, and an oppositely disposed presser member arranged to hold a product to be refrigerated in intimate contact with said vertical face.

2. A refrigerating apparatus comprising a refrigerating chamber, a vertically-disposed conveyor band movable through said chamber, means for holding a product to be refrigerated in engagement with said vertical face while it is conveyed through said chamber, and means for circulating a refrigerating medium across the opposite face of said band.

3. A refrigerating apparatus comprising a pair of heat-conductive members having oppositely disposed vertical faces, means for relatively moving said members to engage and press a product to be refrigerated between said vertical faces, and means for refrigerating said product while thus engaged.

4. A refrigerating apparatus comprising a pair of heat-conductive members having oppositely disposed vertical faces, one of said members being maintained in predetermined position and the other being yieldingly urged toward said member to firmly engage a product therebetween, and means to refrigerate the product while thus engaged by said members.

5. A refrigerating apparatus comprising a refrigerating chamber, a pair of vertically-disposed conveyor bands movable in adjacent paths through said chamber with the product to be frozen maintained pressed between them, and means for delivering a refrigerating medium to outwardly-directed faces of said bands.

6. A refrigerating apparatus comprising a refrigerating chamber, a pair of vertically-disposed conveyor bands for maintaining the product to be frozen engaged between the bands, means for refrigerating the bands in areas opposite to the engaged product and a cooperating horizontally-disposed conveyor band arranged to travel beneath the product.

7. A refrigerating apparatus comprising a movable heat-conductive member having a vertically-disposed face, means for sustaining the weight of a product to be frozen while such product is in contact with said vertical face, and means for constantly refrigerating said vertical face.

8. A refrigerating apparatus comprising a pair of heat-conductive members having opposed vertical faces, interposed means for sustaining the weight of a product to be frozen in position between said heat-conductive members, and means for refrigerating said members in areas opposite the interposed product.

9. A refrigerating apparatus comprising a pair of heat-conductive members having opposed vertical faces, a series of rolls located adjacent to the lower edge of said heat-conductive members and between the same and constituting collectively a substantially continuous support cooperating with said members to support an interposed product to be frozen, and means for continuously refrigerating said vertical faces in areas opposite to the interposed product.

10. A refrigerating apparatus comprising an endless heat-conductive band, means for maintaining said band in vertical position including means for supporting the lower edge thereof, and means for applying cooling medium to one face thereof.

11. A refrigerating apparatus comprising an endless heat-conductive band, means for maintaining said band in vertical position, and means for applying cooling medium to one face thereof.

12. A refrigerating apparatus comprising an endless heat-conductive band disposed on edge and guided for movement in a predetermined horizontal path, means for conducting cooling medium to one face of the band, and means for supporting the lower edge of the band including a belt disposed at substantially right angles thereto.

13. A refrigerating apparatus comprising an endless heat-conductive band disposed on edge and guided for movement in a horizontal path, means for conducting cooling medium to one face of the band, a flat supporting belt arranged to underlie the lower edge of said heat-conductive band, and means for shifting a portion of said band transversely without disturbing its relation to said supporting belt.

14. A refrigerating apparatus comprising a pair of heat-conductive bands having opposed vertical faces, means for conducting cooling medium to the outwardly-directed faces of the bands, means for supporting the weight of a product interposed between the bands, and means for supporting the lower edges of both bands.

15. A refrigerating apparatus comprising a pair of movable spaced vertically-disposed heat-conductive bands, guiding means for controlling the path of one of said bands, said means being bodily movable to carry its associated band transversely toward the other band whereby the space between said bands is adjustable to products of varying thicknesses, and means for applying cooling medium to the bodily movable band in all positions thereof.

16. A refrigerating apparatus comprising a pair of heat-conductive members having opposted vertical faces, means for conducting a refrigerating medium to and from said members, and means for supporting one member for movement transversely toward the other with a measured and adjustable pressure.

17. A refrigerating apparatus comprising heat-conductive article-enveloping bands movable on edge in parallel paths at substantially the same rate of speed, and a piping system including a series of perforated pipes for supplying liquid cooling medium to an outwardly-directed face of each band.

18. A refrigerating apparatus comprising a heat-conductive band guided for horizontal movement with its faces in vertical position, and means for supplying liquid cooling medium to one face thereof in a series of vertical zones disposed transversely of the band.

19. A refrigerating apparatus comprising a heat-conductive band disposed in vertical position, means for guiding it for movement in a horizontal path comprising a series of spaced rolls, and means for refrigerating the band comprising vertical spray pipes interposed between said rolls.

20. Refrigerating apparatus for quick-freezing liquid food products comprising heat-conductive members having spaced opposed vertical faces, means for continuously refrigerating said faces, and a vertically-disposed container for liquid having parallel side faces of extensive area arranged to be engaged in intimate contact with the vertical faces of said heat-conductive members.

21. A refrigerating apparatus comprising two vertically-disposed plates in spaced relation, and adjustable in their spaced relation to engage and compress between them a product to be refrigerated, and means to refrigerate a product while pressed between said plates.

22. A refrigerating apparatus comprising two vertically-disposed plates, supported in substantially parallel spaced relation, and adjustable in their spaced relation to engage and compress between them products of varying thicknesses, and means to maintain the product-engaging surfaces of said plates at a freezing temperature, whereby a product engaged by said plates will be refrigerated through the agency of said plates.

23. A refrigerating apparatus comprising two vertically-disposed imperforate heat-conductive plates, spaced apart, and adapted to firmly confine between them a product to be refrigerated, and means for applying a freezing medium to the outer faces of said plates, whereby the product confined between said plates will be refrigerated through the agency of said plates.

24. A refrigerating apparatus comprising two vertically-disposed surfaces adapted to engage and confine between them a product to be refrigerated, means to press said surfaces into firm engagement with said product, and means to simultaneously refrigerate said product.

25. A refrigerating apparatus comprising two imperforate endless metal bands, vertically-disposed, and with adjacent reaches in substantially parallel relation, and spaced apart to engage and compress between them a product to be refrigerated, and means for applying a freezing medium to the outer faces of said bands, whereby the product will be refrigerated through the agency of said bands.

26. A refrigerating apparatus comprising two endless metal bands, vertically-disposed, and with adjacent reaches in substantially parallel relation, and adapted to engage and confine therebetween a product to be refrigerated, means for applying refrigerating fluid to the outer faces of the product-engaging reaches of said bands, and means to prevent said fluid from entering the area between said reaches and engaging said product.

27. A refrigerating apparatus comprising two endless metal bands, vertically-disposed, and with adjacent reaches in substantially parallel relation, one of said reaches being unyieldingly supported, and means to urge uniformly the other reach toward said first reach, whereby a product positioned between said reaches will be firmly engaged therebetween, and means for maintaining said surfaces at a freezing temperature to refrigerate a product engaged between the same.

28. A refrigerating apparatus comprising two endless metal bands, vertically-disposed, and with adjacent reaches in substantially parallel spaced relation, said reaches being adapted to engage and confine between them a product to be refrigerated, pulleys for said bands, means to refrigerate a product while engaged and confined between said bands, and means to move said bands in synchronism about said pulleys, the pulleys at the discharge end of the apparatus being so positioned that said bands will simultaneously disengage from said refrigerated product at said delivery end.

29. A refrigerating apparatus comprising two endless imperforate metal bands, vertically-disposed and arranged in parallel relation, and adapted to engage between their adjacent reaches an article to be frozen, means to move said bands in synchronism, and means to refrigerate a product while engaged between said bands.

30. A refrigerating apparatus comprising a pair of vertically-disposed plates in substantially parallel spaced relation, and adapted to engage and firmly compress between them a product to be refrigerated, a horizontally disposed support positioned between said plates to support said product while engaged by said plates, and means to refrigerate said product while thus engaged.

31. A refrigerating apparatus comprising a pair of vertically-disposed plates in substantially parallel relation, and adapted to engage and compress between them a product to be refrigerated, a horizontally disposed conveyor band positioned between said plates, and arranged to support said product while engaged by said plates, and means to refrigerate said product while thus engaged.

32. A refrigerating apparatus comprising two vertically disposed endless metal bands, with adjacent reaches in substantially parallel relation, a conveyor belt positioned between said vertically-disposed bands, adapted to support a product engaged therebetween, means for maintaining said vertically-disposed bands at a freezing temperature to refrigerate said product, and means to move said vertically-disposed bands and said supporting belts in synchronism.

33. A refrigerating apparatus comprising two vertically-disposed metal bands arranged to engage a product to be refrigerated upon opposite sides, means for applying a liquid cooling medium to the outer faces of said bands, and means interposed between said bands for supporting the product above the level of the lower edges of the bands, whereby the product is maintained out of contact of said cooling medium.

34. A refrigerating apparatus comprising cooperating heat-conductive members having oppositely-disposed vertical faces for engaging opposite sides of an article to be frozen, one of said members being movable transversely toward and from the other to accommodate articles of different thicknesses, and stationary means for spraying a liquid refrigerating medium upon the transversely movable heat-conductive members in all positions thereof.

CLARENCE BIRDSEYE.